(No Model.)
W. S. CALLAGHAN.
PNEUMATIC TIRE.
No. 496,336. Patented Apr. 25, 1893.
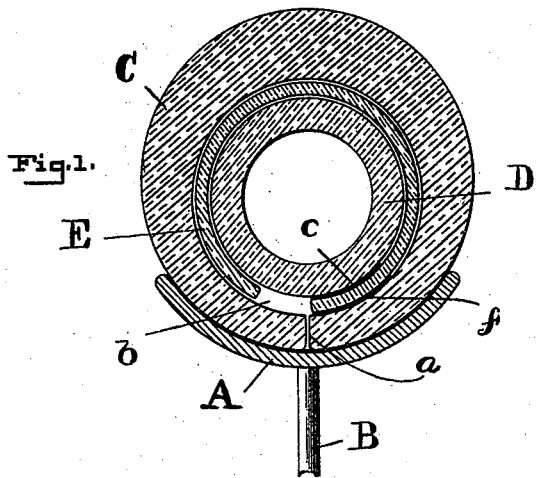
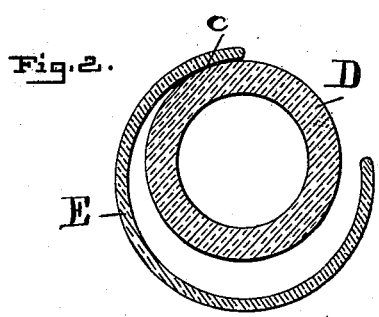
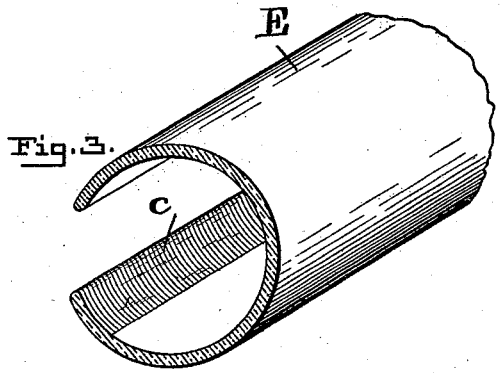
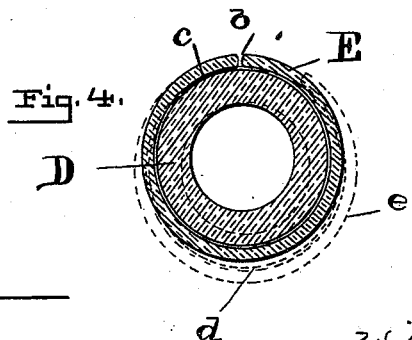
WITNESSES:
A. O. Babendreier
J. Parker Davis
INVENTOR:
William S. Callaghan,
By Chas. B. Mann
atty.
THE NORRIS PETERS CO., PHOTO-LITHO., WASHINGTON, D. C.

UNITED STATES PATENT OFFICE.

WILLAM S. CALLAGHAN, OF BALTIMORE, MARYLAND, ASSIGNOR OF ONE-HALF TO CHAS. T. HOLLOWAY, OF SAME PLACE.

PNEUMATIC TIRE.

SPECIFICATION forming part of Letters Patent No. 496,336, dated April 25, 1893.

Application filed December 5, 1892. Serial No. 454,179. (No model.)

*To all whom it may concern:*

Be it known that I, WILLAM S. CALLAGHAN, a citizen of the United States, residing at Baltimore, in the State of Maryland, have invented certain new and useful Improvements in Pneumatic Tires, of which the following is a specification.

The object of this invention is to render pneumatic tires such as used on bicycles, sulkies and other vehicles, impervious to penetration. Various expedients have been resorted to for the accomplisment of this object, as for instance by the interposition of non-penetrable material covering the inflated tube of the tire. But such a cover or lining, being non-elastic destroys the elasticity of the tire itself. I contemplate surmounting this difficulty by making such cover loose on the tube and open, and I accomplish this result by the construction shown in the accompanying drawings, in which,—

Figure 1 shows a cross-section of the complete tire; Fig. 2, a sectional view of the inner tube which contains the compressed air, and the non-penetrable cover depending by its point of attachment to said tube to illustrate the relation of said cover to the tube. Fig. 3 shows a perspective view of the said cover. Fig. 4 shows a section view of the inside tube with the cover in its proper position around it, and a dotted representation illustrating the expansion of the tube under pressure and the adaptation of the cover to such expansion.

The letter, A, designates the metal rim of the wheel which rim is dished in the ordinary way to receive the pneumatic tire, and is attached to the spokes, B. The outside rubber tube, C, of the tire, which receives the direct impact under action, is split at, *a*, on the inner side to receive the inner tube, D, which contains the charge of compressed air. The said outer tube, C, engages the dished metal rim, A, and is fastened thereto by cement or otherwise with its edges at the split, *a*, abutting; thus it completely incloses the inner tube, D. A cover, E, of raw-hide or other non-penetrable material surrounds the inner tube, and is split at, *b*, and fastened to the tube at one side of said split, this point of attachment being designated by the letter, *c*, and being the only place where the said cover is attached, the remainder of it being loose on the tube. In the normal condition of the inner tube,—*i. e.*, before it is charged with compressed air,—the cover, E, will extend entirely around it as illustrated in Fig. 4. When the charge of compressed air is introduced and the tube expands, as illustrated by the dotted line, *d*, in said Fig. 3, the cover, E, opens at the split, *b*; the cover in this state is designated by the dotted line, *e*. Hence such expansion is not in any way restricted by the non-elastic cover, and the flexibility of the tire is not disturbed in the least. When the inflated tube is introduced into the outer tube it is set so that the split, *b*, is behind the metal rim, A, as shown in Fig. 1, whereby there will be no possibility of penetration of the inner tube through the said split, and the said inner tube is fastened to the outer tube by cementing or otherwise attaching the cover, E, to said outer tube at the point, *f*, the same place of attachment of the cover to the inner tube; this is to prevent possibility of the inner tube slipping around to a position where the split, *b*, would be exposed. The inflated tube also stretches under action, and here again the advantage of my arrangement is apparent, for the open loose cover does not in any way interfere with perfect freedom of the tire in expanding and contracting under such action. It will now be seen that my construction does not affect the elasticity of the tire in the least, and yet it renders the tire invulnerable.

Having thus described my invention, what I claim as new, and desire to secure by Letters Patent, is—

In a pneumatic tire, the combination of an inner elastic tube; an outer elastic tube; and an impenetrable, non-elastic cover inclosing the inner elastic tube, and having a split extending in a peripherical direction entirely around it on that side adjacent the metallic rim of the wheel, one edge only of the split being cemented or otherwise secured to one of the elastic tubes; the rest of the cover being unattached and loose, for the purpose described.

In testimony whereof I affix my signature in presence of two witnesses.

WILLAM S. CALLAGHAN.

Witnesses:
F. PARKER DAVIS,
JNO. T. MADDOX.